Figure 1:
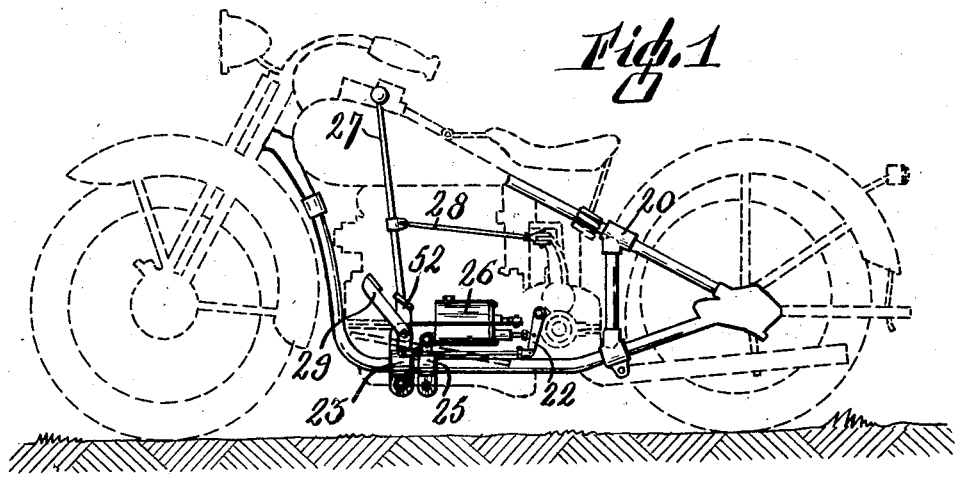

July 14, 1931.  A. CHARTIER  1,814,896

CLUTCH CHECK AND RELEASE APPARATUS

Filed June 13, 1929   2 Sheets-Sheet 1

Adjutor Chartier  Inventor

By *Marion & Marion*

Attorneys

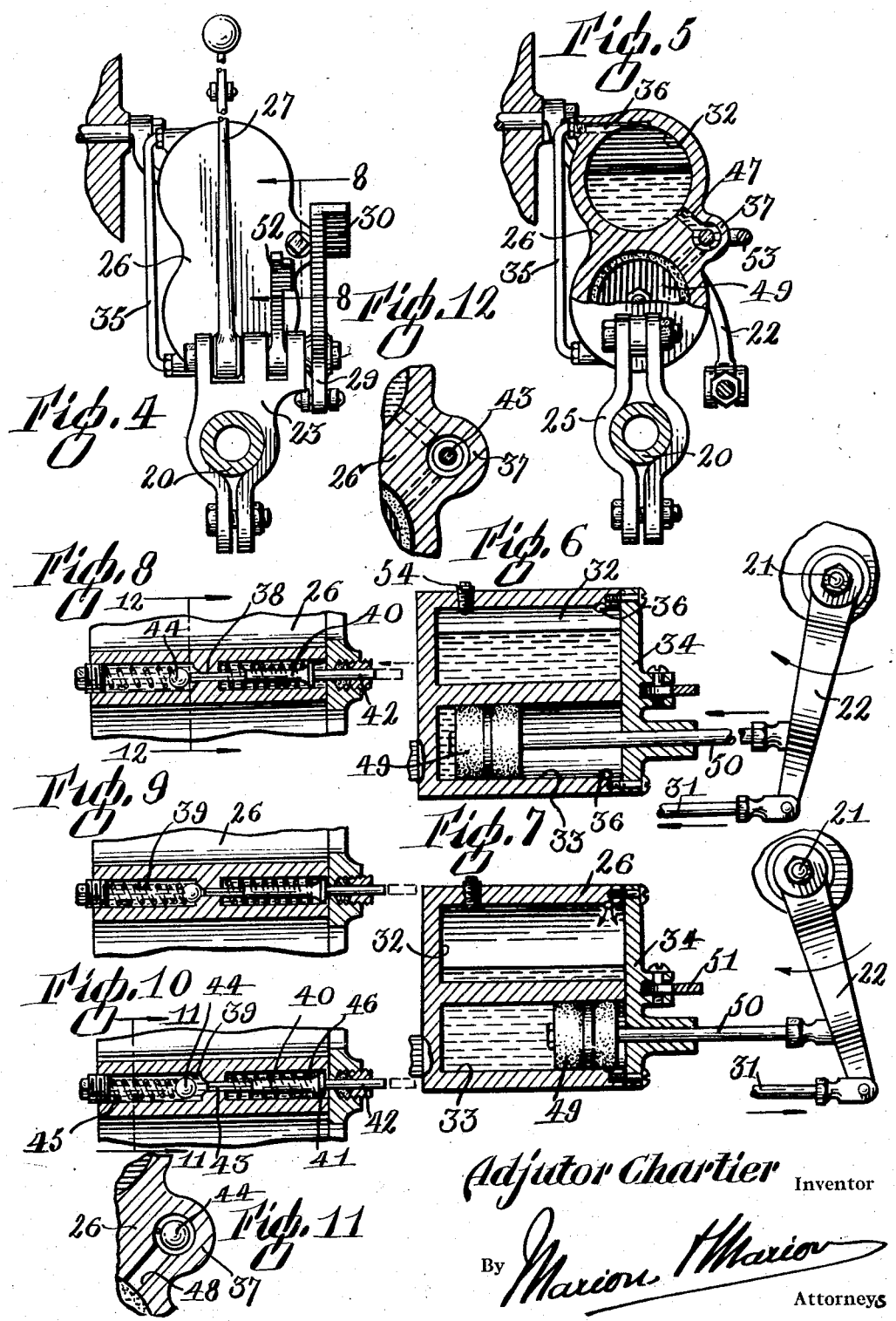

Patented July 14, 1931

1,814,896

UNITED STATES PATENT OFFICE

ADJUTOR CHARTIER, OF SHERBROOKE, QUEBEC, CANADA, ASSIGNOR OF TWENTY-FIVE PER CENT TO ARTHUR LAGUEUX AND TWENTY-FIVE PER CENT TO JOSEPH EMILE PELLETIER, OF QUEBEC, CANADA

CLUTCH CHECK AND RELEASE APPARATUS

Application filed June 13, 1929. Serial No. 370,705.

The present invention relates to clutch controlling mechanism particularly adapted for checking and releasing the clutch crank of motor cycles and similar motor vehicles.

Heretofore, it has been the common practice, in the construction in the well known standard types of motor cycles, to provide a foot pedal operated clutch control mechanism which will disengage the clutch when the pedal is depressed. Due to the usual clutch spring, tending to throw the clutch into engagement, it is necessary, with this construction, to constantly retain the foot on the pedal to retain the clutch in disengaged position, permitting the operator to place one foot only upon the ground to balance the vehicle. This is disadvantageous as it is often difficult or inconvenient to support the vehicle in upright position unless both feet can be placed upon the ground for this purpose.

An important object of the present invention is the provision of mechanism which will check or retain the clutch in disengaged position after operation of the operating pedal so that both feet may be placed upon the ground to balance the motor cycle in stationary position.

A further object of the invention is the provision of mechanism associated with the foot operated clutch control apparatus which will automatically check the clutch in disengaged position and retain the same thus until released.

Another object of the invention is the provision of an automatically operating clutch mechanism for pedal operated clutch apparatus and an auxiliary foot pedal operated release mechanism.

Still another object of the invention is the provision of a clutch check and release mechanism of the above character which will be operated through the medium of manually controlled fluent material.

Other objects and advantages of the invention will become apparent as the description progresses.

Figure 2:
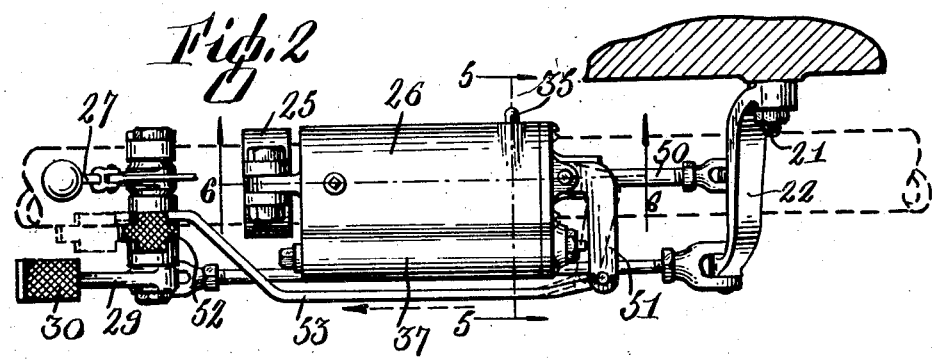
Figure 3:
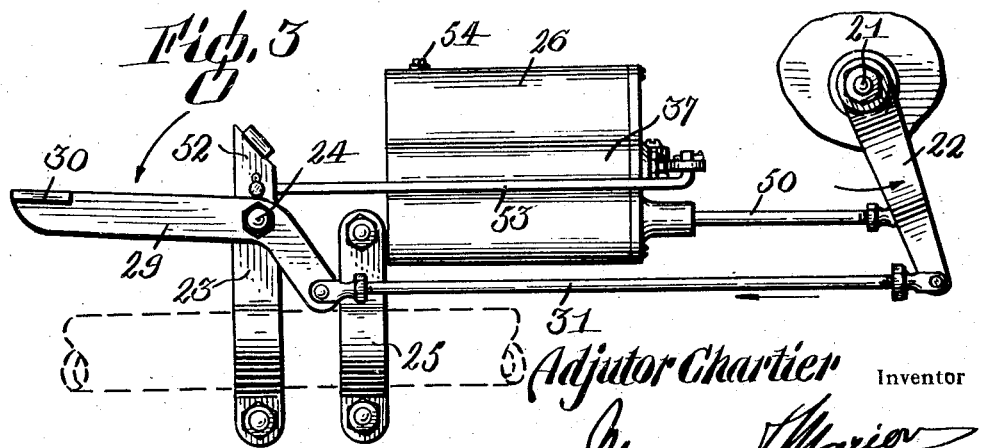

In the accompanying drawings forming a part of this specification and in which like reference characters are employed to designate corresponding parts throughout the same:

Figure 1 is a diagrammatic side elevational view of a motor cycle showing the improved clutch operating mechanism associated therewith, Figure 2 is an enlarged top plan view of the clutch operating mechanism, Figure 3 is a side elevational view of the same, Figure 4 is a front end elevational view of the same, Figure 5 is a transverse sectional view taken on the line 5—5 of Figure 2, showing the bottom portion in elevation, Figure 6 is a longitudinal section on line 6—6 of Figure 2, showing the clutch crank in elevation and in clutch engaging position, Figure 7 is a similar view showing the clutch crank in clutch disengaging position, Figure 8 is a vertical longitudinal section taken on the line 8—8 of Figure 4, showing the ball valve forced from its seat by the valve rod, Figure 9 is a similar view showing the ball valve in closed position, Figure 10 is a similar view showing the ball valve unseated by the pressure of the fluent material, Figure 11 is an enlarged fragmentary section taken on the line 11—11 of Figure 10, and Figure 12 is a similar view taken on the line 12—12 of Figure 8.

Referring to the drawings, wherein for the purpose of illustration is shown a preferred embodiment of the invention, the numeral 20 generally designates a motor cycle frame formed of tubular bars suitably connected on the conventional motor cycle construction diagrammatically outlined.

From the lower rear portion of the vehicle is laterally extended the outer end of a clutch shaft 21 having attached thereto a laterally offset crank 22. The clutch, which is of common construction, embodies an interior spring arranged to normally urge the clutch into engaging position, wherein the crank 22 is swung to a forwardly inclined arrangement, as shown in Figures 1 and 2.

The bottom longitudinally extending bar of the frame 20 carries an upright bracket 23 embracing the bar and composed of a pair of complementary folded sections arranged to support in the upper portion a transverse rotatable spindle 24. Rearwardly of the bracket 23 is mounted a complementary bracket 25 arranged in a similar position adapted to pivotally support in a horizontal arrangement an elongated casing 26.

On the inner portion of the spindle 24 is pivotally connected a gear shift lever 27 disposed for movement in a vertical arc and connected with the transmission mechanism through a connecting rod 28. On the outer portion of the spindle is journaled a foot pedal embodying an angular lever 29 pivoted intermediate its ends and carrying on one extremity a tread plate 30. To the opposed end of the foot lever 29 is pivotally connected a clutch operating rod 31. The opposed end of the rod 31 is pivotally connected with the free end of the clutch crank 22 for direct manual operation of the clutch.

The casing 26 is divided longitudinally to provide a pair of longitudinally extending parallel compartments 32 and 33 arranged one above the other and of cylindrical form. The rear end of the casing is enclosed by a removable head 34 having an opening and tubular sleeve projection in registration with the lower chamber 33. The upper and lower compartments are in communication through an exterior conduit 35 connected to transverse ports 36 extending transversely through the casing wall communicating with the top of the upper compartment and the bottom of the lower compartment.

Extending longitudinally at one side of the casing 26, at an intermediate position, is a longitudinal tubular valve housing 37 divided intermediate its ends by a transverse partition 38 formed with a reduced axial through bore forming communication between enlarged longitudinal chambers 39. Mounted for axial sliding movement in the rear chamber 39 is a valve rod 40 formed with an enlarged shoulder 41 and having an extension 42 projecting through an aperture in the casing head. The inner extremity of the valve rod 40 is formed with a non-circular, preferably square extension 43 slidable in the reduced bore in the partition 38 and disposed to operate a ball valve 44 disposed in the forward compartment. In valve closing position, the ball valve 44 is urged upon a recessed seat against the rear side of the partition by means of a coiled compression spring 45. The bore in which the square stem extension 43 operates is preferably of circular form so as to afford passages between the extension and the wall of the bore for the passage of fluent matter. A compression spring 46 is also arranged about the valve rod 40 acting against the shoulder 41 to normally urge the rod to a forwardly extended position. The rear valve compartment 39 communicates with the upper casing chamber 32 through a transverse upwardly inclined passage 47 while the rear valve compartment is in communication with the lower chamber 33 through a downwardly inclined passage 48.

Mounted for reciprocating axial movement in the lower casing chamber 33 and snugly fitting the walls thereof is a piston 49 having attached thereto a piston rod 50 extending through the rear casing head and pivotally connected with the intermediate portion of the clutch crank 22.

Pivotally connected with the rear end of the casing and disposed to swing in a horizontal plane in registration with the rear extension of the valve rod 40 is an angular push bar 51 arranged to engage the valve rod and depress the same when plunged forwardly toward the casing. The push bar 51 is actuated through the medium of a pedal 52 pivotally connected with the spindle 24 and having connection with the push bar through a link 53.

The casing chambers 32 and 33 contain a fluent material, preferably oil, adapted to exert hydraulic pressure upon the piston 49. The oil is introduced through a filling opening in the top of the casing normally closed by a plug 54.

In operation, when the operator desires to temporarily stop the vehicle, he disengages the clutch by an initial foot movement, pressing downwardly on the tread plate 30 so as to swing the pedal lever 29 and consequently swing the clutch actuating crank 22 through a rearwardly directed arc. He may then remove his foot from the pedal and conveniently balance the vehicle by placing both feet on the ground. As the clutch crank 22 is swung rearwardly, the piston rod 50 and piston 49 will be simultaneously actuated to rearwardly extended positions. The rearward movement of the piston will force the air compressed in the rear portion of the lower compartment 33 through the lower passage 36 and through the exterior conduit 35 into the upper portion of the top compartment 32. The pressure accumulated in the upper compartment will force the oil through the rear valve chamber 39 and the reduced communicating bore 38 so as to force the ball valve 44 from its seat and discharge the oil into the lower casing compartment 33 in front of the piston. Upon completion of this operation, the ball valve will be returned upon its seat to prevent a return flow of the fluent material so as to obviate return forward movement of the piston and to retain the clutch in its disengaged position against the action of the clutch spring.

When it is desired to again engage the clutch to resume movement of the vehicle, the operator presses the release pedal 52 which will cause forward swinging movement of the push bar 51 and the valve rod 40. The valve rod will thus force the valve to an unseated position so that the action of the clutch spring will return the piston to its initial position and discharge the oil into the upper casing compartment.

It is to be understood that the form of my invention herein shown and described is to be taken as a preferred example of the same, and that various changes as to the shape, size, and arrangement of parts may be resorted to without departing from the spirit of the invention or the scope of the subjoined claims.

Having thus described my invention, I claim:

1. In apparatus of the character described, the combination with a clutch crank and foot controlled mechanism for swinging said crank from its normal motor engaging position to a disengaging position, of a casing, a piston mounted for reciprocating movement in the casing and attached to the clutch crank, a second casing above the first communicating therewith and holding a supply of fluid, check valve means for automatically inserting fluid from the second casing pressure against the piston to retain the clutch in disengaged position, and means for releasing the check valve means to permit return of the fluid to the casing and thereby enable the clutch and clutch crank to assume their normal engaged positions.

2. In motor clutch actuating mechanism, the combination with a crank attached to the clutch shaft, foot actuated mechanism for adjusting the clutch crank from a clutch engaging to a clutch disengaging position against the action of the clutch spring, of a casing having a plurality of compartments one of which contains a fluid, a piston mounted for reciprocating movement in one of the casing compartments connected with the clutch crank, check valve means separate from the casings, controlling the passage of fluid from one casing to that containing the piston whereby to automatically act to check the piston in extended clutch disengaging position, and foot controlled mechanism for adjusting the check valve means to return the fluid to its casing, release the piston and permit the clutch to return to its normal engaged position.

3. In motor clutch actuating mechanism, the combination with a crank attached to a clutch shaft, foot actuated mechanism for adjusting the clutch crank from a clutch engaging to a clutch disengaging position against the action of the clutch spring, of a casing having an upper and a lower compartment, a smaller compartment adjacent the other two, a piston mounted for reciprocating movement in the lower compartment and connected with the clutch crank, a ball valve dividing the smaller compartment into two chambers, conduits connecting each compartment to one chamber each of the smaller one for the passage of a fluid contained in the upper compartment, means for automatically permitting passage of the fluid through the valve in one direction only, and foot actuated means for releasing said valve and enabling movement of the fluid in the reverse direction.

In witness whereof I have hereunto set my hand.

ADJUTOR CHARTIER.